(12) United States Patent
Ishimatsu

(10) Patent No.: US 9,715,044 B2
(45) Date of Patent: Jul. 25, 2017

(54) ANTIREFLECTION FILM, AND OPTICAL ELEMENT AND OPTICAL SYSTEM THAT INCLUDE THE SAME

(71) Applicant: CANON KABUSHIKI KAISHA, Tokyo (JP)

(72) Inventor: Rie Ishimatsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/823,375

(22) Filed: Aug. 11, 2015

(65) Prior Publication Data
US 2016/0061996 A1   Mar. 3, 2016

(30) Foreign Application Priority Data
Aug. 27, 2014   (JP) .................................. 2014-172842

(51) Int. Cl.
| | | |
|---|---|---|
| *G02B 1/11* | (2015.01) | |
| *G02B 1/115* | (2015.01) | |
| *G02B 1/113* | (2015.01) | |
| *G02B 1/118* | (2015.01) | |

(52) U.S. Cl.
CPC .............. *G02B 1/115* (2013.01); *G02B 1/11* (2013.01); *G02B 1/113* (2013.01); *G02B 1/118* (2013.01)

(58) Field of Classification Search
CPC ............ G02B 1/11; G02B 1/113; G02B 1/118
USPC ................................................ 359/580, 586
See application file for complete search history.

(56) References Cited

U.S. PATENT DOCUMENTS

| | | | | |
|---|---|---|---|---|
| 4,802,737 A | * | 2/1989 | Denton .................. | G02B 1/115 359/588 |
| 6,663,957 B1 | * | 12/2003 | Takushima .............. | B32B 27/06 428/355 R |
| 7,771,832 B2 | | 8/2010 | Nakayama et al. | |
| 8,084,082 B2 | * | 12/2011 | Nakayama .............. | G02B 1/111 427/162 |
| 8,541,049 B2 | * | 9/2013 | Nakayama .............. | G02B 1/111 427/162 |

(Continued)

FOREIGN PATENT DOCUMENTS

| | | |
|---|---|---|
| JP | 2008233880 A | 10/2008 |
| JP | 2009145644 A | 7/2009 |

(Continued)

*Primary Examiner* — William R Alexander
(74) *Attorney, Agent, or Firm* — Rossi, Kimms & McDowell LLP

(57) ABSTRACT

An antireflection film formed on a substrate having a refractive index between 1.40 and 1.85 inclusive for light having a wavelength of 550 nm includes an intermediate layer formed on the substrate, and a concavo-convex layer formed on the intermediate layer, the concavo-convex layer includes a part has a refractive index that continuously increases from a side closer to a surface toward a side closer to the substrate, the intermediate layer includes a plurality of thin film layers having different refractive indices, and at least one of the thin film layers has a refractive index higher than the refractive index of the substrate, and the thin film layers include a first layer formed on the substrate and having a physical thickness d1, and a second layer formed on the first layer and having a physical thickness d2, and satisfy predetermined conditional expressions.

11 Claims, 13 Drawing Sheets

(56) References Cited

U.S. PATENT DOCUMENTS

| | | | | |
|---|---|---|---|---|
| 2006/0154044 | A1* | 7/2006 | Yamada | C03C 17/007 428/312.2 |
| 2010/0053760 | A1* | 3/2010 | Uchida | G02B 1/115 359/601 |
| 2011/0102900 | A1* | 5/2011 | Hayashibe | G02B 1/118 359/601 |
| 2011/0136286 | A1* | 6/2011 | Stewart | C23C 16/0245 438/57 |
| 2012/0062995 | A1* | 3/2012 | Momoki | G02B 1/115 359/580 |
| 2012/0212827 | A1* | 8/2012 | Kakegawa | C03C 1/008 359/601 |
| 2012/0229906 | A1* | 9/2012 | Miyahara | B82Y 20/00 359/601 |
| 2012/0275027 | A1* | 11/2012 | Okuno | G02B 1/115 359/601 |
| 2013/0027779 | A1* | 1/2013 | Okuno | G02B 1/11 359/586 |
| 2013/0242397 | A1* | 9/2013 | Ogumi | G02B 5/0221 359/601 |
| 2013/0260096 | A1* | 10/2013 | Shiki | C23C 18/1295 428/142 |
| 2013/0271842 | A1* | 10/2013 | Miyahara | G02B 1/11 359/601 |
| 2013/0280489 | A1* | 10/2013 | Nakai | G02B 1/118 428/142 |
| 2013/0329295 | A1 | 12/2013 | Okuno | |
| 2014/0044919 | A1* | 2/2014 | Makino | G02B 1/115 428/141 |
| 2014/0177059 | A1 | 6/2014 | Ishimatsu et al. | |
| 2015/0103226 | A1* | 4/2015 | Takahashi | G02B 1/118 348/335 |

FOREIGN PATENT DOCUMENTS

| | | |
|---|---|---|
| JP | 2012078597 A | 4/2012 |
| JP | 2013257405 A | 12/2013 |
| JP | 2014122961 A | 7/2014 |
| JP | 2014235318 A | 12/2014 |

* cited by examiner

ANTIREFLECTION FILM, AND OPTICAL ELEMENT AND OPTICAL SYSTEM THAT INCLUDE THE SAME

BACKGROUND OF THE INVENTION

Field of the Invention

The present invention relates to an antireflection film provided to an optical element.

Description of the Related Art

A conventional optical element is provided with, on its surface, an antireflection film to reduce loss in a light quantity of incident light. For example, an optical element for visible light is provided with a dielectric multi-layered (multi-coated) film. A known antireflection film has a fine structure.

Japanese Patent Laid-open No. 2012-78597 discloses an antireflection film including, as a top layer, a layer formed of a nanoporous film or a nanoparticle film and having a low refractive index. Japanese Patent Laid-open No. 2012-78597 discloses that the antireflection film formed to have only a film thickness (100 nm or larger) allowing an accurate formation exhibits a small performance degradation due to a film thickness variation generated in manufacturing. Japanese Patent Laid-open No. 2008-233880 discloses an antireflection film having an effective refractive index that continuously changes from a light incident side to a substrate side and including a top layer formed of plate crystal including aluminum oxide as a primary component.

Japanese Patent Laid-open No. 2012-78597 discloses that a high performance is obtained for vertically incident light. However, since thin film interference is exploited to prevent reflection, reflection-preventive performance is expected to largely degrade for obliquely incident light, especially for light having an incident angle of 45 degrees or more, for which an interference condition is not satisfied. In addition, forming a film on a lens having a large opening angle has difficulties in providing a uniform film across a peripheral part and a central part of the lens. Optimizing a film thickness at the central part is likely to result in a degraded reflectance at the peripheral part. On the other hand, the prior art disclosed in Japanese Patent Laid-open No. 2008-233880 does not disclose detailed designed values (refractive index structure) and antireflection characteristics of films.

SUMMARY OF THE INVENTION

The present invention provides an antireflection film having an excellent incident angle characteristic for a substrate having a low refractive index.

An antireflection film as one aspect of the present invention is formed on a substrate having a refractive index between 1.40 and 1.85 inclusive for light having a wavelength of 550 nm, the antireflection film includes an intermediate layer formed on the substrate, and a concavo-convex layer formed on the intermediate layer, the concavo-convex layer includes a part having a refractive index that continuously increases from a side closer to a surface toward a side closer to the substrate, the intermediate layer includes a plurality of thin film layers having different refractive indices, and at least one of the thin film layers has a refractive index higher than the refractive index of the substrate, the thin film layers include a first layer formed on the substrate and having a physical thickness d1 (nm), and a second layer formed on the first layer and having a physical thickness d2 (nm), and the thin film layers satisfy predetermined conditional expressions.

An optical element as another aspect of the present invention includes the antireflection film.

An optical system as another aspect of the present invention includes a plurality of optical elements, and at least one of the optical elements includes the antireflection film.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. In the present specification, values of refractive indices are values at a wavelength of 550 nm.

Figure 1:
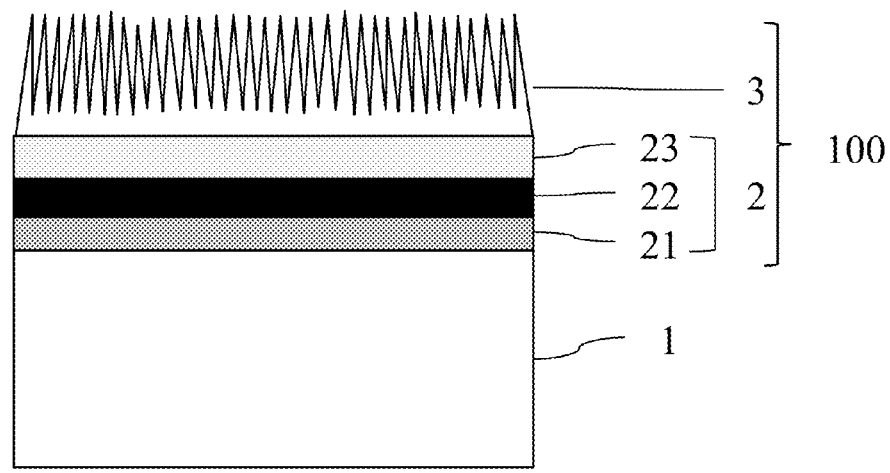
FIG. 1 is a schematic diagram of an antireflection film according to an embodiment of the present invention.

FIG. 1 is a schematic diagram of an antireflection film that is an embodiment of the present invention. FIG. 1 illustrates an enlarged diagram near a surface of an optical substrate 1. The optical substrate 1 is formed of optical glass or optical plastic having a refractive index of 1.40 to 1.85, and an antireflection film 100 that is the embodiment of the present invention is formed on the surface of the optical substrate 1. In other words, the antireflection film 100 of the embodiment of the present invention is formed on the optical substrate 1 (low refractive index optical member) having a refractive index between 1.40 and 1.85 inclusive for light having a wavelength of 550 nm. The antireflection film 100 includes an intermediate layer 2 that includes three thin film layers having different refractive indices, and a fine concavo-convex structure 3 having a pattern formed at a pitch shorter than 400 nm. The intermediate layer 2 is formed on the optical substrate 1, and the fine concavo-convex structure 3 (concavo-convex layer) is formed on the intermediate layer 2. In the intermediate layer 2, which includes the plurality of thin film layers having different refractive indices, at least one of the thin film layers has a refractive index higher than that of the optical substrate 1, as described later.

Light incident on a structure whose size is smaller than its wavelength cannot recognize details of the structure, and behaves as if incident on a medium having a refractive index in accordance with the volume ratio of any material included in the fine structure. This characteristic is exploited by the fine concavo-convex structure 3 in the embodiment of the present invention, which includes a plurality of convex portions having a pitch (average pitch) smaller than a shortest wavelength in a use wavelength range (visible range between 400 nm and 700 nm inclusive). The refractive index in accordance with the volume ratio of the material included in the fine structure is called an effective refractive index ($n_{eff}$), and is defined by Equation 1 below based on an equation (Lorentz-Lorenz formula) of the refractive index $n_m$ and space filling fraction ff of the material included in the fine structure.

$$(n_{eff}^2-1)/(n_{eff}^2+2)=ff(n_m^2-1)/(n_m^2+2) \quad (1)$$

The fine concavo-convex structure 3 has the space filling fraction ff that continuously increases from a light incident side (side closer to the surface; surface side) to an intermediate layer 2 side (side closer to the substrate; substrate side), and thus has the effective refractive index $n_{eff}$ that continuously increases from the light incident side. In other words, the fine concavo-convex structure 3 in the embodiment of the present invention includes a part whose refractive index continuously increases from the surface side (light incident side, air side) to the substrate side. The fine concavo-convex structure 3 in the embodiment of the present invention may include a part (homogeneous layer) that is in touch with the intermediate layer 2 and whose refractive index does not change in a thickness direction, as described later. Since light reflection occurs at an interface of two materials having different refractive indices, a structure having a continuously changing refractive index as described above is unlikely to generate reflected waves, thereby achieving a reflection-preventive performance having an excellent angle characteristic and wavelength characteristic as compared to an antireflection film using a dielectric multi-layered film.

For the antireflection film 100 of the embodiment of the present invention to provide a high reflection-preventive performance, the fine concavo-convex structure 3 preferably has a physical thickness between 180 nm and 300 nm inclusive. A physical thickness smaller than 180 nm narrows a wavelength band in which the high reflection-preventive performance is obtained, which leads to an increased reflectance at longer wavelengths (near 650 to 700 nm) in the visible range. A physical thickness larger than 300 nm causes large scattering, which leads to a reduced transmissivity.

Any method of manufacturing the fine concavo-convex structure 3 is applicable as long as the method achieves a structure having a refractive index and film thickness as described above. However, in terms of mass-productivity, a film including an aluminum oxide (alumina) film formed by a vacuum deposition method or a liquid phase method (sol-gel method) is preferably formed by a steam treatment or hot-water immersion treatment. Performing the hot-water treatment on such a layer including aluminum oxide as a primary component formed in this manner can form the fine concavo-convex structure 3 as a layer formed of plate crystal including aluminum oxide as a primary component. When aluminum oxide is used, the fine concavo-convex structure 3 has such an effective refractive index that is substantially equal to one at a position closest to the light incident side (surface layer side), and continuously increases toward the intermediate layer 2 in a range of 1.35 to 1.58.

The fine concavo-convex structure 3 may include the homogeneous layer (having no concavo-convex structure formed therein) remaining in the part in touch with the intermediate layer 2. For example, when an aluminum oxide film is processed with steam and hot water as described above, an amorphous aluminum oxide layer (homogeneous layer) may remain under plate crystal of aluminum oxide deposited on a surface layer and forming a concavo-convex structure. A film thickness of the remaining homogeneous layer can be controlled by controlling a processing time, a processing temperature, a contained amount of aluminum oxide, and contained amounts of added substances such as stabilizing agent and catalyst in material. However, the formation of the homogeneous layer is not limited to the steam and hot-water treatments of the aluminum oxide film, but also can be achieved by forming the fine concavo-convex structure on a surface of an optical element by a method such as nanoimprint. The homogeneous layer may have a refractive index substantially equal to the refractive index at a bottom part of the fine concavo-convex structure.

On the other hand, to obtain a favorable reflectance characteristic for the optical substrate, which has a refractive index in the wide range of 1.40 and 1.85, at least one of the thin film layers included in the intermediate layer 2 desirably has a refractive index higher than that of the optical substrate 1. In addition, the optical substrate 1 and one of the thin film layers included in the intermediate layer 2, which has a highest refractive index, preferably have a refractive index difference larger than or equal to 0.05. A method of manufacturing the intermediate layer 2 is not limited in particular, and can be optionally selected from processes such as the liquid phase method, the vacuum evaporation method and a sputtering method.

To obtain a favorable characteristic for the optical substrate 1 having a refractive index in the wide range as described above, the intermediate layer 2 preferably has a three-layered structure of a first layer 21, a second layer 22 and a third layer 23 as illustrated in FIG. 1. The three-layered structure more preferably includes, from the optical substrate 1 side, the first layer 21 having a refractive index between 1.55 and 1.76 inclusive, the second layer 22 having a refractive index between 1.72 and 1.95 inclusive and the third layer 23 having a refractive index between 1.36 and 1.55 inclusive. To achieve a favorable reflectance characteristic, the refractive index of the second layer 22 desirably satisfies Expression (2) below when the refractive index of the optical substrate 1 is lower than that of the first layer 21, and desirably satisfies Expression (3) below when the refractive index of the optical substrate 1 is higher than that of the first layer 21.

$$-0.943 \times n\text{sub} + 3.05 \le n2 \le -0.943 \times n\text{sub} + 3.31 \quad (2)$$

$$0.667 \times n\text{sub} + 0.544 \le n2 \le 0.333 \times n\text{sub} + 1.35 \quad (3)$$

In Expressions (2) and (3), nsub represents the refractive index of the optical substrate 1, and n2 represents the refractive index of the second layer 22. The value of n2 out of the range of Expression (2) or (3) leads to a degraded wavelength characteristic, which is not preferable.

The first layer 21 preferably has an optical thickness between 100 nm and 300 nm inclusive, the second layer 22 preferably has an optical thickness between 230 nm and 290 nm inclusive, and the third layer 23 preferably has an optical thickness between 70 nm and 100 nm inclusive.

In other words, the first layer 21 formed on the optical substrate 1 preferably has a physical thickness d1 (nm) and a refractive index n1 at a wavelength of 550 nm, which satisfy conditional expressions, $1.55 \le n1 \le 1.76$ and $100 \le n1d1 \le 300$. The second layer 22 formed on the first layer 21 preferably has a physical thickness d2 (nm) and a refractive index n2 at a wavelength of 550 nm, which satisfy conditional expressions, $1.72 \le n2 \le 1.95$ and $230 \le n2d2 \le 290$. The third layer 23 formed on the second layer 22 preferably has a physical thickness d3 (nm) and a refractive index n3 at a wavelength of 550 nm, which satisfy conditional expressions, $1.36 \le n3 \le 1.55$ and $70 \le n3d3 \le 100$. When the refractive index of the optical substrate 1 at a wavelength of 550 nm is represented by ns, ns<n2 is preferably satisfied.

When the refractive index of the optical substrate 1 is higher than the refractive index of the first layer 21, the optical thickness of the first layer 21 is more preferably between 100 nm and 150 nm inclusive. When the refractive index of the first layer 21 is lower than the refractive index of the optical substrate 1, the optical thickness of the first layer 21 is more preferably between 200 nm and 290 nm inclusive. These conditions are provided because of a change in the phase of a reflected wave generated at an interface between the optical substrate and the first layer due to the refractive index difference between the optical substrate and the first layer.

When the fine concavo-convex structure 3 includes the homogeneous layer, the sum of the optical thickness of the homogeneous layer and the optical thickness of the third layer 23 is preferably between nm and 100 nm inclusive. In other words, the homogeneous layer preferably has a refractive index na satisfying $1.35 \le na \le 1.58$ at a wavelength of 550 nm, and a physical thickness da (nm) satisfying a conditional expression $70 \le n3d3 + nada \le 100$.

The material of each thin film layer included in the intermediate layer 2, which is not limited in particular as long as the refractive index ranges described above are satisfied, may be, for example, metallic oxide such $SiO_2$, $MgO_2$, $Al_2O_3$, $Y_2O_3$, MgO, $ZrO_2$, $HfO_2$, and $Ta_2O_5$. Alternatively, for example, metal fluoride such as $Ta_2O_5$, $LaF_3$, $CeF_3$, $NdF_3$, $MgF_2$, and $CaF_2$ may be used. Any compound of these metallic oxides and these metal fluorides may also be used.

When exposed to air, the optical substrate 1 is likely to suffer leak of its components on the surface depending on their materials, which leads to a phenomenon called "burn" that involves tarnish and coloring on the surface of the substrate. To prevent this phenomenon, the first layer 21 is preferably formed of, for example, an $Al_2O_3$ layer. The third layer 23 is preferably a low reactive film stable in air and may be, for example, a $SiO_2$ layer.

A refractive index difference between the third layer 23 and the bottom of the fine concavo-convex structure 3 is preferably smaller than or equal to 0.1, and more preferably smaller than or equal to 0.05. This prevents a reflected wave at an interface between the fine concavo-convex structure 3 and the intermediate layer 2, leading to an improved reflection-preventive performance. When the fine concavo-convex structure 3 includes the homogeneous layer, a refractive index difference between the homogeneous layer and the third layer 23 is preferably smaller than or equal to 0.1, and more preferably smaller than or equal to 0.05.

The antireflection film of the embodiment of the present invention includes optical elements such as a lens, a prism and a fly-eye integrator. These elements included in the antireflection film of the embodiment of the present invention are applicable to, for example, an image pickup optical system, a scanning optical system and a projection optical system. These optical systems are applicable to optical apparatuses such as a camera, a video camera, a binocular, a copier, a printer, a projector and a head-mounted display.

[Embodiment 1]

Figure 2:
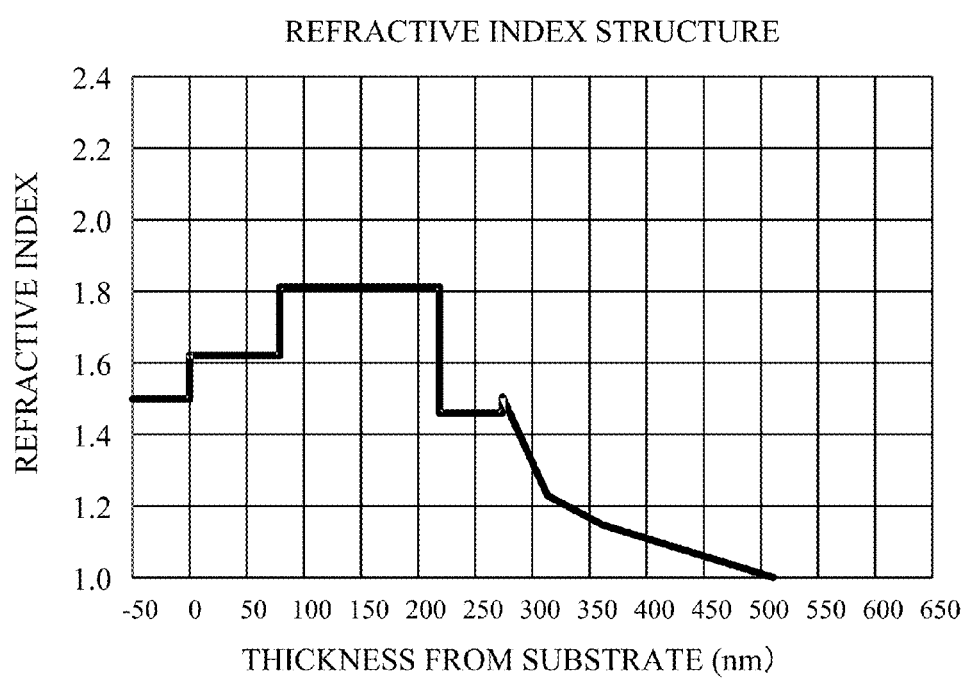
FIG. 2 illustrates a relation of a refractive index with a thickness of an antireflection film that is Embodiment 1 of the present invention.

Table 1 lists parameters of a configuration of the antireflection film 100 that is Embodiment 1 (first embodiment) of the present invention. The intermediate layer 2 in the three-layered structure is formed on the optical substrate 1 having a refractive index of 1.489, on which the fine concavo-convex structure 3 is further formed. The intermediate layer has a configuration including the first layer 21 formed of $Al_2O_3$ having a refractive index of 1.621, the second layer 22 formed of $Y_2O_3$ having a refractive index of 1.812 and the third layer 23 formed of $SiO_2$ having a refractive index of 1.459, the layers being formed by the vacuum evaporation method. The fine concavo-convex structure 3 is formed by performing the hot-water immersion treatment on a film including aluminum oxide as a primary component and formed through spin coating by the sol-gel method. The antireflection film 100 formed by this method has a refractive index in the thickness direction as illustrated in FIG. 2. The refractive index of the fine concavo-convex structure 3 continuously increases from 1 on the light incident side to 1.504 on the intermediate layer 2 side. The change of the refractive index is not constant in the thickness direction, and is larger in a region closer to the light incident side than a region closer to the intermediate layer 2. Such a structure, which is not necessarily needed, can achieve excellent antireflection characteristics in wavelength band and incident angle.

Figure 3A:
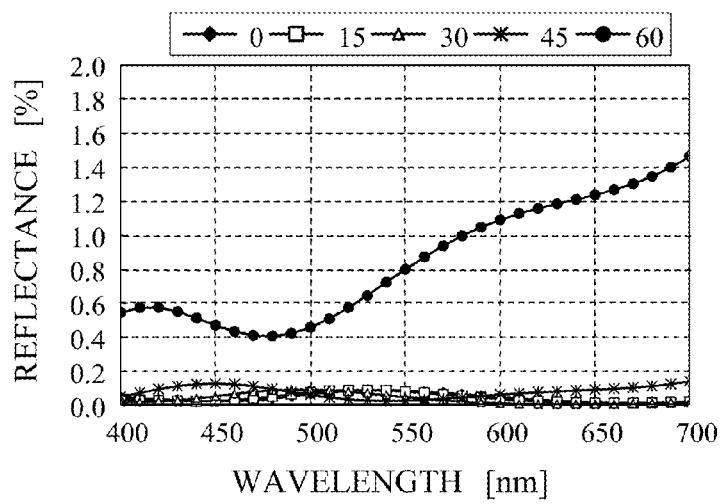
FIG. 3A illustrates a reflectance characteristic in Embodiment 1.

FIG. 3A illustrates a reflectance characteristic of the antireflection film 100 of the present embodiment. In FIG. 3A, numerical values 0, 15, 30, 45, and 60 each represent an incident angle (in degrees). FIG. 3A illustrates that the antireflection film 100 of the present embodiment achieves a high reflection-preventive performance of a reflectance of 0.2% or less over a wide wavelength band in the entire visible range (400 to 700 nm) for an incident angle of 45 degrees or less.

Figure 3B:
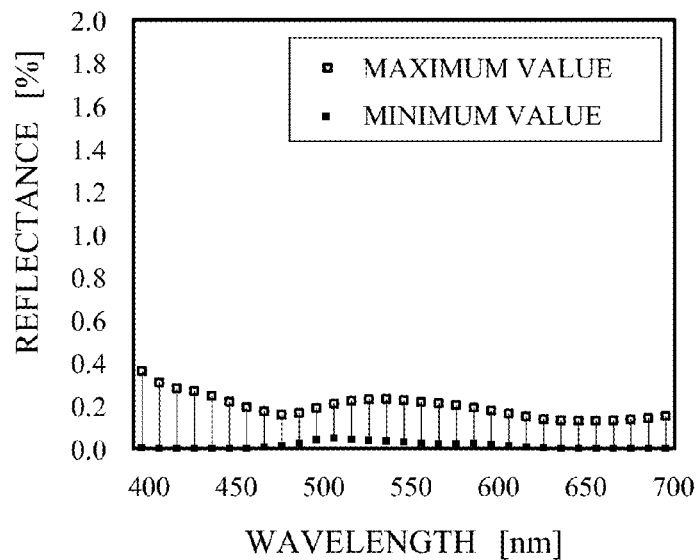
FIG. 3B illustrates a reflectance variation (at an incident angle of 0°) when a thickness of an intermediate layer in Embodiment 1 has a variation of ±10%.
Figure 3C:
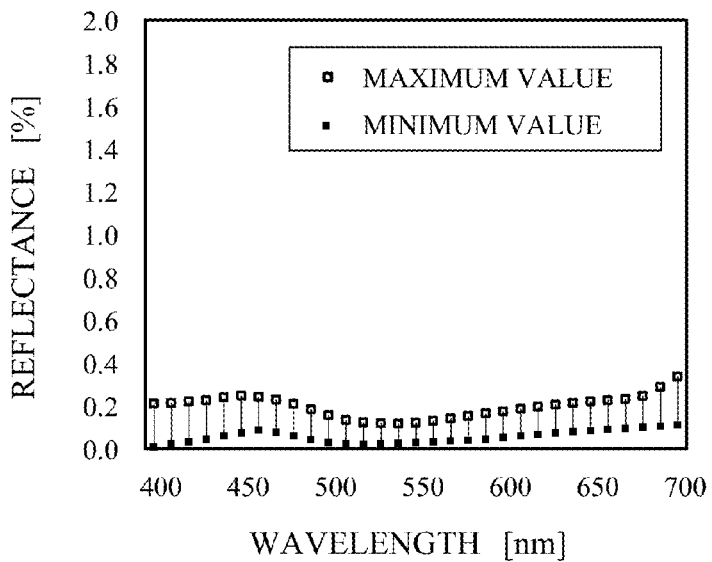
FIG. 3C illustrates a reflectance variation (at an incident angle of 45°) when the thickness of the intermediate layer in Embodiment 1 has a variation of ±10%.

FIGS. 3B and 3C illustrate calculated reflectance values for incident angles of 0 and 45 degrees when the intermediate layer of the antireflection film 100 of the present embodiment, which is formed by the vacuum evaporation method, has a variation of a maximum of 10% in its film thickness. The film thickness variation is generated equally between the first to third layers in a range of a center value ±10% using random numbers, and the calculated reflectance values in FIGS. 3B and 3C have maximum and minimum values at each wavelength that are obtained by repeating the calculation 100 times. As illustrated in FIGS. 3B and 3C, the antireflection film of the present embodiment maintains a reflectance characteristic of 0.4% or less in the visible wavelength range (400 to 700 nm) when the film thickness of the intermediate layer 2 has the variation of a maximum of 10%, and thus is unlikely to be affected by manufacturing variation and variation in a lens surface.

TABLE 1

| | | n | d(nm) | nd |
|---|---|---|---|---|
| Fine concavo-convex structure | Concavo-convex layer | 1 to 1.504 | 224 | — |
| | Homogeneous layer | — | — | — |
| Intermediate layer | Third layer | 1.459 | 55 | 80 |
| | Second layer | 1.812 | 140 | 254 |
| | First layer | 1.621 | 79 | 128 |
| Optical substrate | | 1.498 | — | — |

COMPARATIVE EXAMPLE 1

Figure 4A:
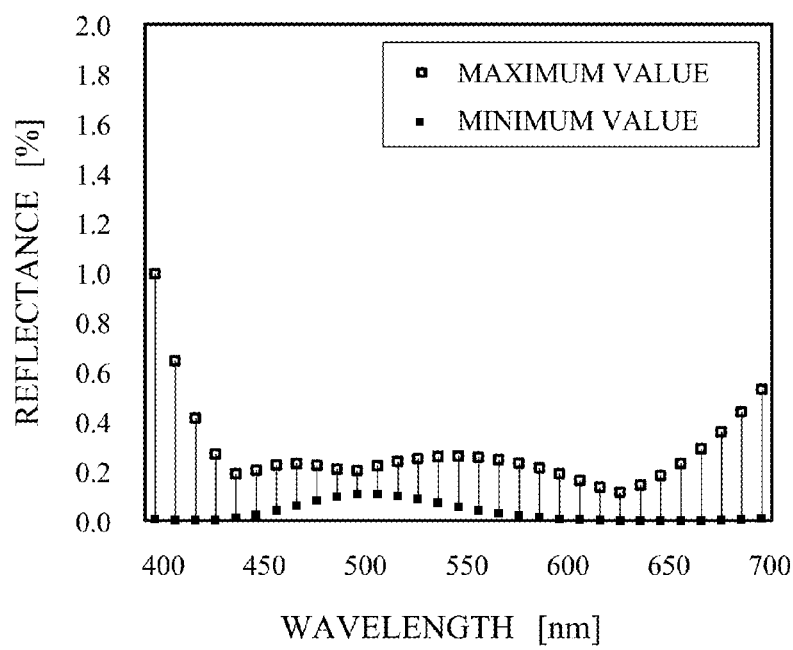
FIG. 4A illustrates a reflectance variation (at an incident angle of 0°) when a thickness of an intermediate layer in Comparative Example 1 has a variation of ±10%.
Figure 4B:
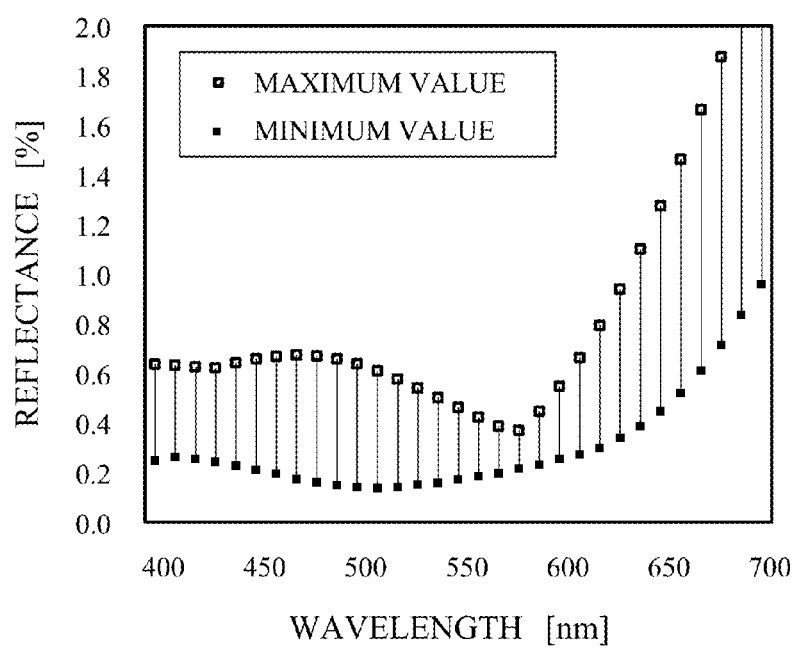
FIG. 4B illustrates a reflectance variation (for an incident angle of 45°) when the thickness of the intermediate layer in Comparative Example 1 has a variation of ±10%.

Similarly to Embodiment 1, FIGS. 4A and 4B illustrate calculated reflectance values for incident angles of 0 and 45 degrees when the film thickness of a part (layer except for a low refractive index layer) that is disclosed in Numerical Example 1 of Japanese Patent Laid-open No. 2012-78597 and corresponds to the intermediate layer of the antireflection film, has a variation of a maximum of 10%. The reflectance has a wavelength characteristic somewhat different from a result disclosed in Japanese Patent Laid-open No. 2012-78597 because of a different refractive index dispersion across the layers.

Comparison between FIGS. 4A and 4B and FIGS. 3B and 3C indicates that a more favorable characteristic is obtained for the film thickness variation of the intermediate layer in Embodiment 1 than in the Comparative Example 1 (numerical example 1 of Japanese Patent Laid-open No. 2012-78597). In particular, a large difference is found in a characteristic for an incident angle of 45 degrees. This is because a top layer formed of nanoparticles (layer having a fine structure of a scale smaller than an incident wavelength) in Japanese Patent Laid-open No. 2012-78597 has a constant refractive index in the thickness direction unlike the embodiment of the present invention. In other words, Japanese Patent Laid-open No. 2012-78597 has such a configuration that multi-layered film interference between four thin film layers including the top layer is used to obtain a reduced reflectance, and thus a reflectance characteristic of the configuration degrades when the interference cannot be maintained due to variations in film thicknesses or a large incident angle. On the other hand, the embodiment of the present invention has a refractive index that continuously changes in the thickness direction, and is unlikely to generate reflected waves, thereby achieving a favorable antireflection film by optimizing the intermediate layer 2 when the film thicknesses have variations.

[Embodiment 2]

Table 2 lists parameters of a configuration of the antireflection film 100 that is Embodiment 2 (second embodiment) of the present invention. The configuration is the same as that in Embodiment 1 except that the homogeneous layer remains at the bottom part of the fine concavo-convex structure 3.

Figure 5A:
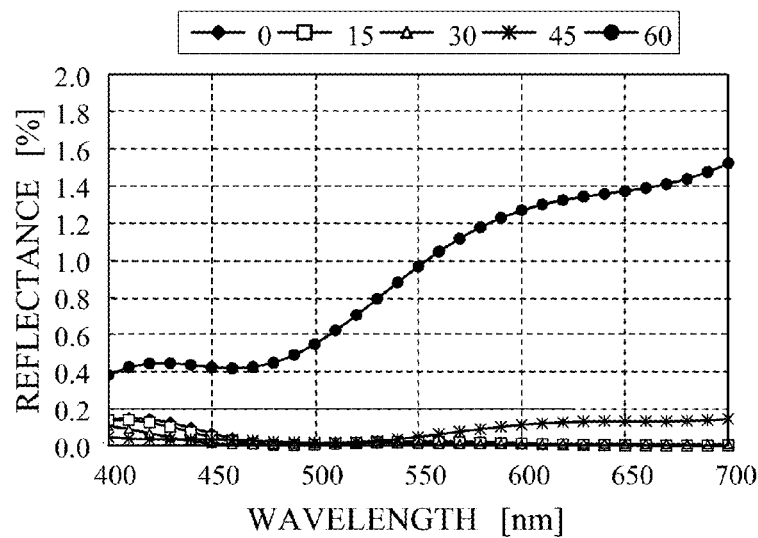
FIG. 5A illustrates a reflectance characteristic in Embodiment 2 of the present invention.

FIG. 5A illustrates a reflectance characteristic of the antireflection film 100 of the present embodiment. FIG. 5A indicates that the antireflection film 100 of Embodiment 2 exhibits a reflectance characteristic of 0.2% or less for an incident angle of 45 degrees or less in the entire visible range, which is a reflectance characteristic as excellent as or more excellent than that in Embodiment 1. Thus, when the homogeneous layer remains at the bottom part of the fine concavo-convex structure 3 through film formation, a high reflection-preventive performance can still be achieved by optimizing the film thickness of the intermediate layer 2, especially the film thickness of the third layer 23. A higher reflection-preventive performance can be achieved owing to an increased designing freedom, as compared to a case without the homogeneous layer, obtained by controlling the remaining homogeneous layer.

TABLE 2

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 1.812 | 140 | 254 |
| | First layer | 1.621 | 79 | 128 |
| Optical substrate | | 1.498 | — | — |

COMPARATIVE EXAMPLE 2

Table 3 lists parameters of a configuration of an antireflection film of Comparative Example 2 of the present invention. Comparative Example 2 has the same refractive indices and optical thicknesses as those in Embodiment 2 except that the second layer has a refractive index of 1.65.

Figure 5B:
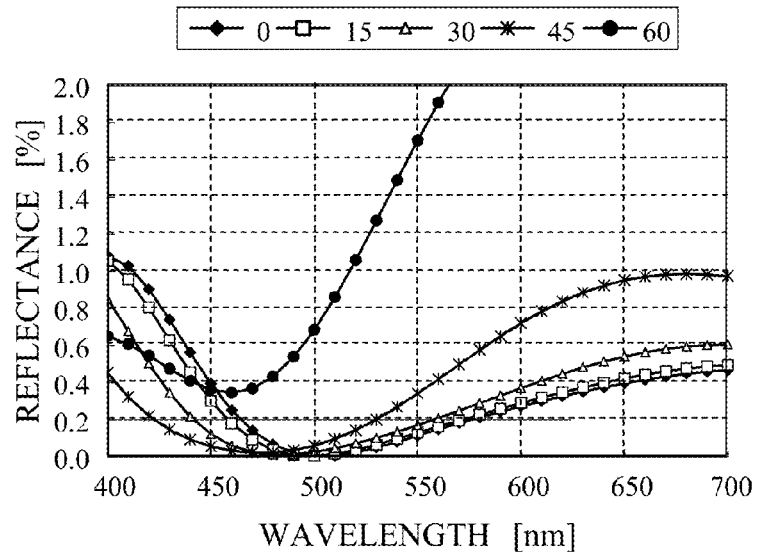
FIG. 5B illustrates a reflectance characteristic in Comparative Example 2.

FIG. 5B illustrates a reflectance characteristic in Comparative Example 2. FIG. 5B indicates that the antireflection film in Comparative Example 2 exhibits an favorable reflectance characteristic near 500 nm, but a range of wavelengths in which the reflectance is low is narrower than that in Embodiment 2. Thus, a too low refractive index of the second layer results in a degraded wavelength characteristic. To achieve a favorable reflectance characteristic, the refractive index n2 of the second layer needs to satisfy a range larger than or equal to 1.70.

TABLE 3

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 1.650 | 154 | 254 |
| | First layer | 1.621 | 79 | 128 |
| Optical substrate | | 1.498 | — | — |

COMPARATIVE EXAMPLE 3

Table 4 lists parameters of a configuration of an antireflection film in Comparative Example 3 of the present invention. Comparative Example 3 has the same refractive indices and optical thicknesses as those in Embodiment 2 except that the second layer has a refractive index of 2.00.

Figure 5C:
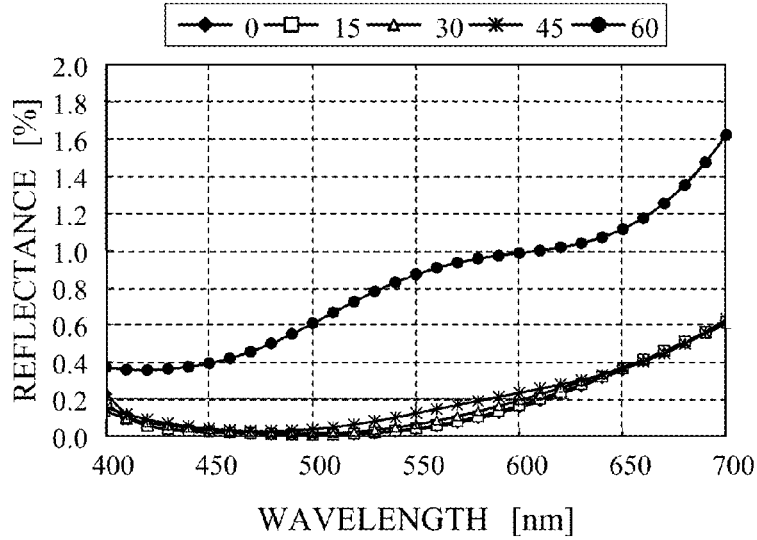
FIG. 5C illustrates a reflectance characteristic in Comparative Example 3.

FIG. 5C illustrates a reflectance characteristic in Comparative Example 3. FIG. 5C indicates that the antireflection film in Comparative Example 3 exhibits a favorable characteristic at 400 to 600 nm, but the reflectance is high at wavelengths larger than or equal to 600 nm. Thus, a too high refractive index of the second layer results in a degraded wavelength characteristic. In addition, a high reflectance at long wavelengths leads to reddish reflected light, which is not preferable especially for an image pickup optical system. To achieve a favorable reflectance characteristic, the refractive index n2 of the second layer needs to satisfy a range smaller than or equal to 1.95.

TABLE 4

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 2.000 | 127 | 254 |
| | First layer | 1.621 | 79 | 128 |
| Optical substrate | | 1.498 | — | — |

[Embodiment 3]

Table 5 lists parameters of a configuration of the antireflection film 100 that is Embodiment 3 (third embodiment) of the present invention. The homogeneous layer remains at the bottom part of the fine concavo-convex structure 3, and the configuration is the same as that in Embodiment 1 except that the third layer 23 of the intermediate layer 2 is not included.

Figure 6:
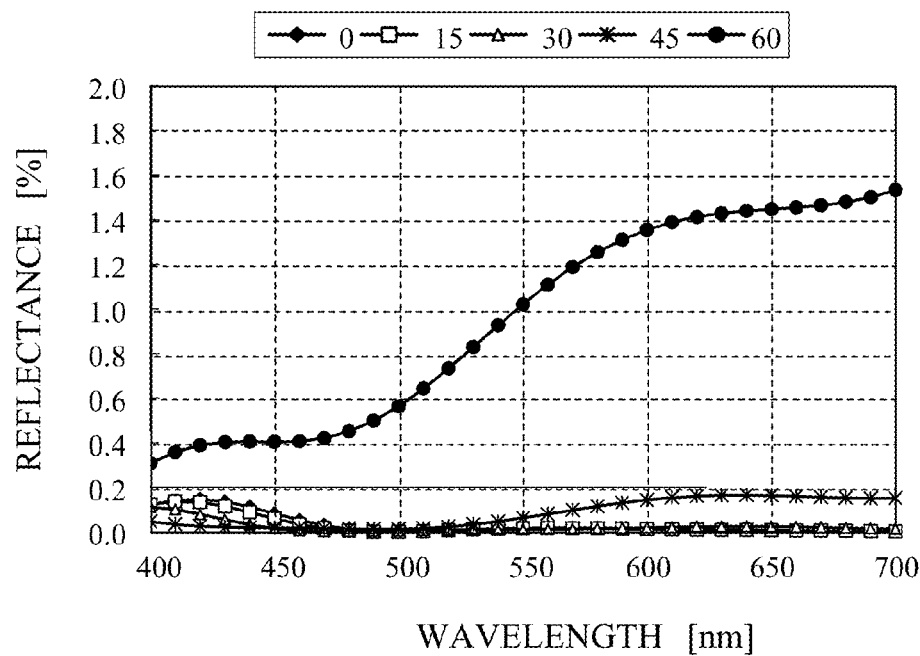
FIG. 6 illustrates a reflectance characteristic in Embodiment 3 of the present invention.

FIG. 6 illustrates a reflectance characteristic of the antireflection film 100 of the present embodiment. FIG. 6 indicates that the antireflection film of Embodiment 3 exhibits a reflectance characteristic of 0.2% or less for an incident angle of 45 degrees or less in the entire visible range, which is a reflectance characteristic as excellent as or more excellent than that in Embodiment 1. In Embodiment 3, the homogeneous layer having an optimum film thickness remains at the bottom part of the fine concavo-convex structure 3, which enables the configuration including the intermediate layer 2 of two layers to achieve a high reflection-preventive performance equivalent to that in the case that the intermediate layer 2 has the three layers.

TABLE 5

| | | n | d (nm) | nd |
|---|---|---|---|---|
| Fine concavo-convex structure | Concavo-convex layer | 1 to 1.504 | 224 | — |
| | Homogeneous layer | 1.504 | 60 | 90 |
| Intermediate layer | Third layer | 1.459 | 0 | 0 |
| | Second layer | 1.812 | 140 | 254 |
| | First layer | 1.621 | 79 | 128 |
| Optical substrate | | 1.498 | — | — |

[Embodiment 4]

Table 6 lists parameters of a configuration of an antireflection film 100 that is Embodiment 4 (fourth embodiment) of the present invention. The antireflection film 100 of Embodiment 4 is formed on the optical substrate 1 having a refractive index of 1.585. The intermediate layer 2 includes the first layer 21 of $Al_2O_3$, the second layer 22 of MgO and the third layer 23 of $SiO_2$, which are formed by the sputtering method. The fine concavo-convex structure 3 is formed by the same method as that in Embodiment 1.

Figure 7:
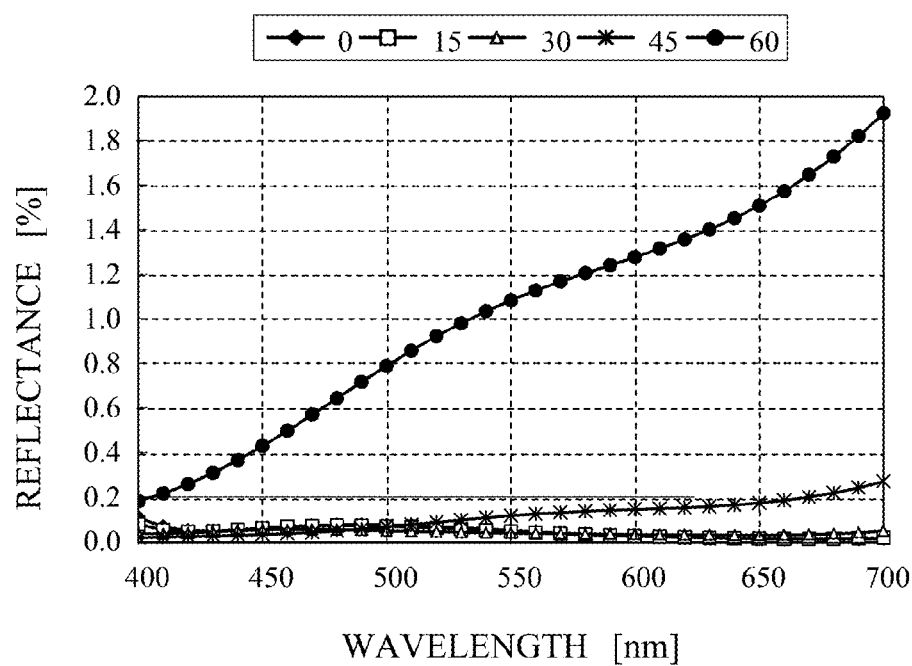
FIG. 7 illustrates a reflectance characteristic in Embodiment 4 of the present invention.

FIG. 7 illustrates a reflectance characteristic of the antireflection film 100 of the present embodiment. FIG. 7 indicates that the antireflection film 100 of Embodiment 4 exhibits a reflectance characteristic of 0.3% or less for an incident angle of 45 degrees or less in the entire visible range, and achieves a high reflection-preventive performance.

TABLE 6

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 20 | 29 |
| | Second layer | 1.740 | 152 | 264 |
| | First layer | 1.621 | 75 | 122 |
| Optical substrate | | 1.585 | — | — |

[Embodiment 5]

Figure 8A:
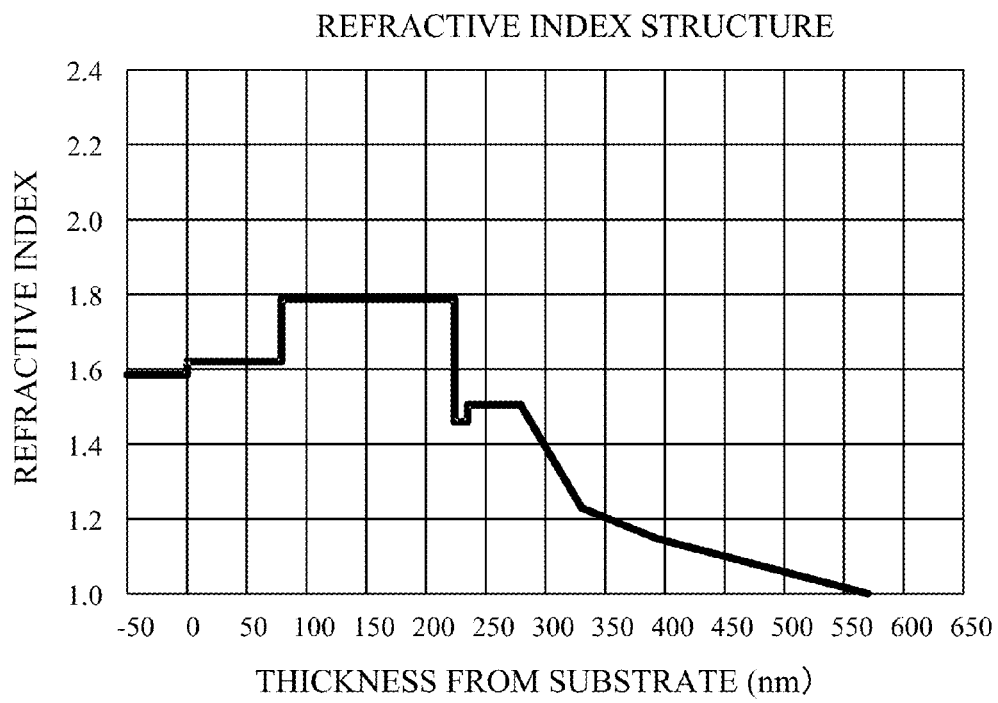
FIG. 8A illustrates a relation of a refractive index with a thickness of an antireflection film that is Embodiment 5 of the present invention.

Table 7 lists parameters of a configuration of an antireflection film 100 that is Embodiment 5 (fifth embodiment) of the present invention. Similarly to Embodiment 4, the antireflection film 100 of Embodiment 5 is formed on the optical substrate 1 having a refractive index of 1.585. The intermediate layer 2 includes the first layer 21 of $Al_2O_3$, the second layer 22 of a composite of $ZrO_2$ and $Al_2O_3$ and the third layer 23 of $SiO_2$, which are formed by the sputtering method. The fine concavo-convex structure 3 is formed by the same method as that in Embodiment 1. However, in the present embodiment, the thickness of the alumina film formed through the spin coating is adjusted to thicken the fine concavo-convex structure 3 as compared to Embodiment 1. FIG. 8A illustrates the refractive index of the antireflection film 100 of the present embodiment in the thickness direction.

Figure 8B:
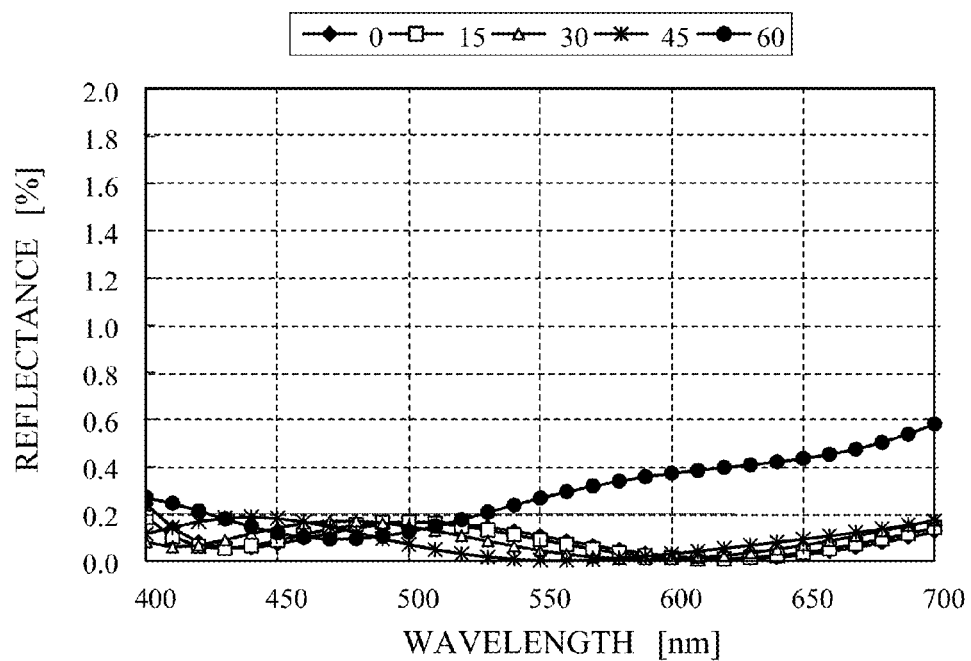
FIG. 8B illustrates a reflectance characteristic in Embodiment 5.

FIG. 8B illustrates a reflectance characteristic of the antireflection film 100 of the present embodiment. FIG. 8B indicates that the antireflection film 100 of Embodiment 5 exhibits a highly favorable reflectance characteristic of 0.3% or less for an incident angle of 45 degrees or less in the entire visible range and 0.6% for an incident angle of 60 degrees in the entire visible range, and achieves a high reflection-preventive performance.

TABLE 7

| | | n | d (nm) | nd |
|---|---|---|---|---|
| Fine concavo-convex structure | Concavo-convex layer | 1 to 1.504 | 291 | — |
| | Homogeneous layer | 1.504 | 44 | 66 |
| Intermediate layer | Third layer | 1.459 | 11 | 16 |
| | Second layer | 1.788 | 145 | 259 |
| | First layer | 1.621 | 79 | 128 |
| Optical substrate | | 1.585 | — | — |

[Embodiment 6]

Figure 9A:
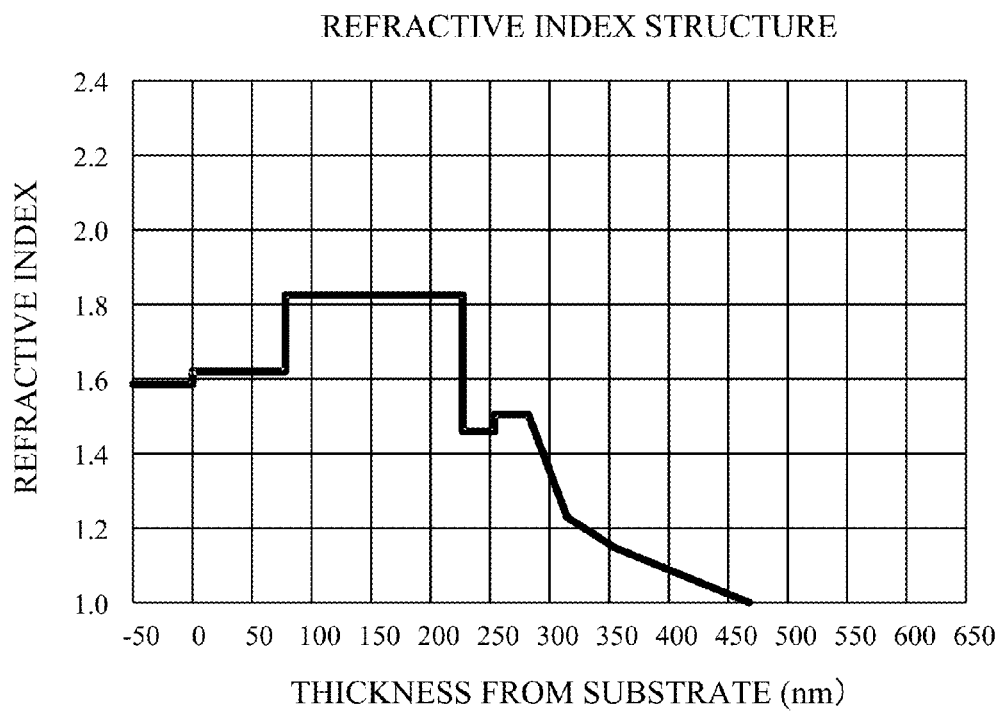
FIG. 9A illustrates a relation of a refractive index with a thickness of an antireflection film that is Embodiment 6 of the present invention.

Table 8 lists parameters of a configuration of an antireflection film 100 that is Embodiment 6 (sixth embodiment) of the present invention. Similarly to Embodiments 4 and 5 the antireflection film 100 of Embodiment 6 is formed on the optical substrate 1 having a refractive index of 1.585. The intermediate layer 2 includes the first layer 21 of $Al_2O_3$, the second layer 22 of $Y_2O_3$ and the third layer 23 of $SiO_2$, which are formed by the sputtering method. The fine concavo-convex structure 3 is formed by the same method as that in Embodiment 1. However, in the present embodiment, the thickness of the alumina film formed through the spin coating is adjusted to thin the fine concavo-convex structure 3 as compared to Embodiment 1. FIG. 9A illustrates the refractive index of the antireflection film 100 of the present embodiment in the thickness direction.

Figure 9B:
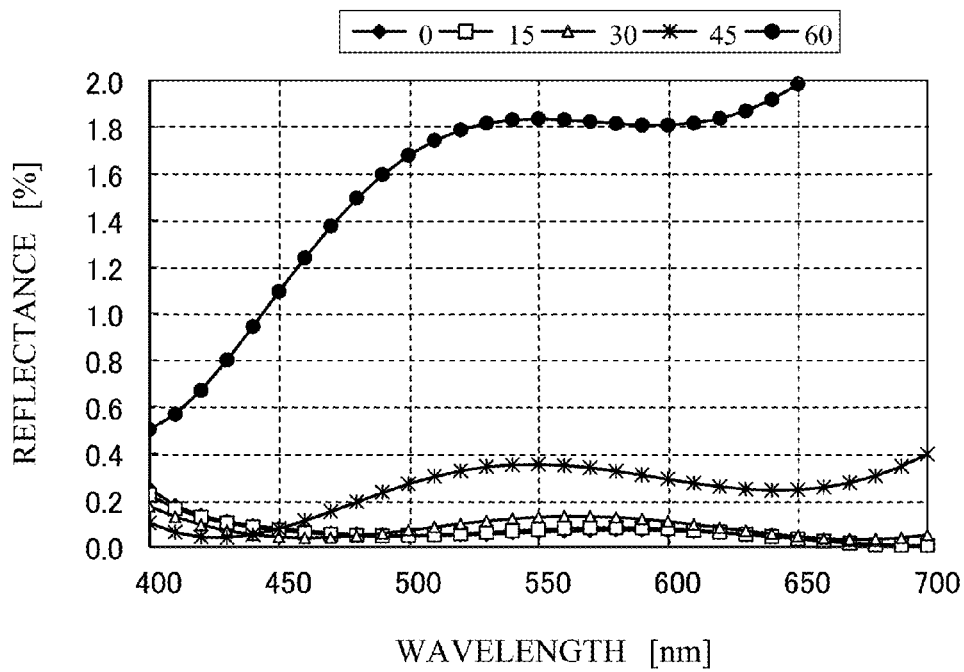
FIG. 9B illustrates a reflectance characteristic in Embodiment 6.

FIG. 9B illustrates a reflectance characteristic of the antireflection film 100 of the present embodiment. FIG. 9B indicates that the antireflection film 100 of Embodiment 6 exhibits a reflectance characteristic of 0.4% or less for an incident angle of 45 degrees or less in the entire visible range, and achieves a high reflection-preventive performance. The antireflection film 100 of the present embodiment can reduce scattering because the film thickness of the fine concavo-convex structure 3 is about 15% thinner than that in Embodiment 1.

TABLE 8

| | | n | d (nm) | nd |
|---|---|---|---|---|
| Fine concavo-convex structure | Concavo-convex layer | 1 to 1.504 | 186 | — |
| | Homogeneous layer | 1.504 | 28 | 42 |
| Intermediate layer | Third layer | 1.459 | 27 | 39 |
| | Second layer | 1.825 | 149 | 272 |
| | First layer | 1.621 | 78 | 126 |
| Optical substrate | | 1.585 | — | — |

[Embodiment 7]

Table 9 lists parameters of a configuration of an antireflection film 100 that is Embodiment 7 (seventh embodiment) of the present invention. The antireflection film 100 of Embodiment 7 is formed on the optical substrate 1 having a refractive index of 1.440. The intermediate layer 2 includes the first layer 21 of $Al_2O_3$, the second layer 22 of a composite of $Al_2O_3$ and $ZrO_2$ and the third layer 23 of $SiO_2$, which are formed by the sputtering method. The fine concavo-convex structure 3 is formed by the same method as that in Embodiment 1.

Figure 10:
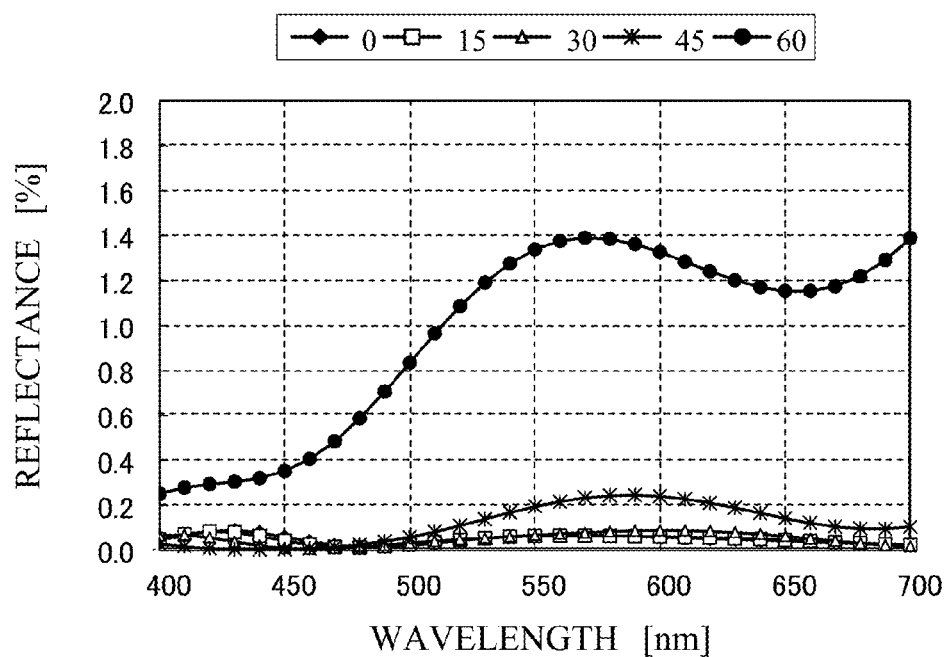
FIG. 10 illustrates a reflectance characteristic in Embodiment 7 of the present invention.

FIG. 10 illustrates a reflectance characteristic of the antireflection film 100 of the present embodiment. FIG. 10 indicates that the antireflection film 100 of Embodiment 7 exhibits a reflectance characteristic of 0.3% or less for an incident angle of 45 degrees or less in the entire visible range, and achieves a high reflection-preventive performance.

TABLE 9

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 1.900 | 140 | 266 |
| | First layer | 1.621 | 86 | 139 |
| Optical substrate | | 1.440 | — | — |

[Embodiment 8]

Figure 11A:
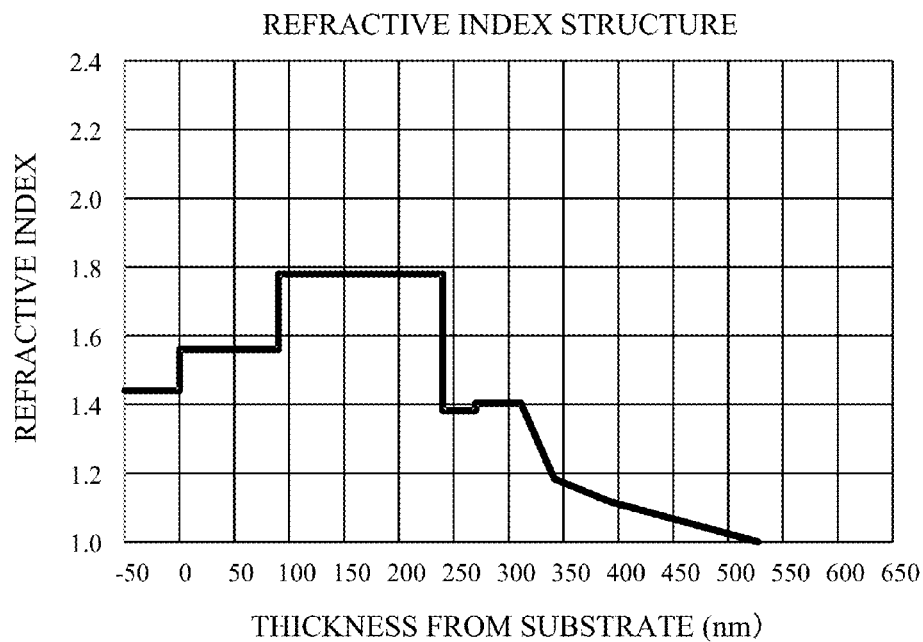
FIG. 11A illustrates a relation of a refractive index with a thickness of an antireflection film that is Embodiment 8 of the present invention.

Table 10 lists parameters of a configuration of an antireflection film 100 that is Embodiment 8 (eighth embodiment) of the present invention. Similarly to Embodiment 7, the antireflection film 100 of Embodiment 8 is formed on the optical substrate 1 having a refractive index of 1.440. The intermediate layer 2 includes the first layer 21 of $LaF_2$, the second layer 22 of a composite of $Al_2O_3$ and $ZrO_2$ and the third layer 23 of $MgF_2$, which are formed by the vacuum evaporation method. The fine concavo-convex structure 3 is formed by the same method as that in Embodiment 1. However, in the present embodiment, a condition of the hot-water immersion treatment is adjusted to have lower refractive indices of the bottom of the fine concavo-convex structure 3 and the homogeneous layer than those in Embodiment 1. FIG. 11A illustrates the refractive index of the antireflection film 100 of the present embodiment in the thickness direction.

Figure 11B:
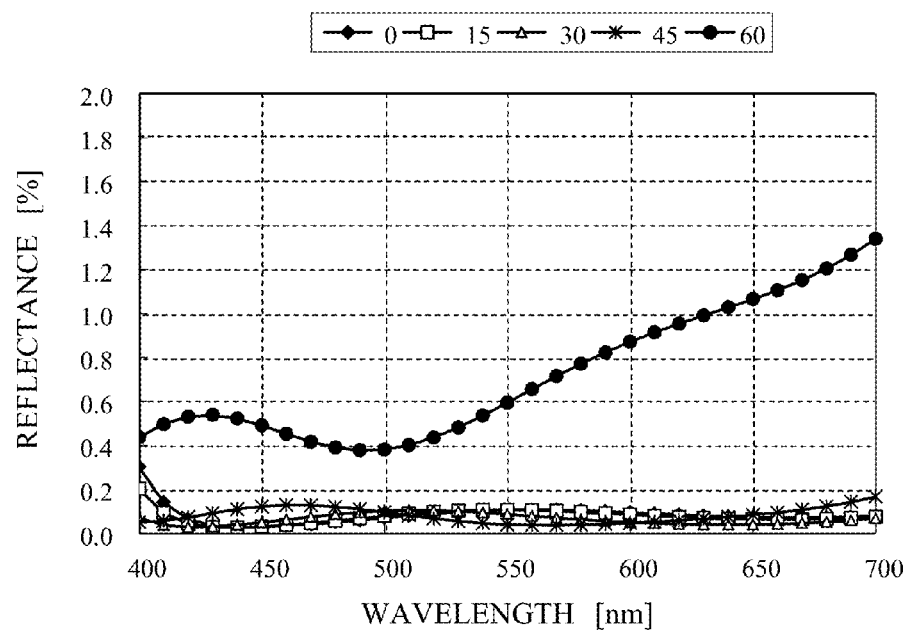
FIG. 11B illustrates a reflectance characteristic in Embodiment 8.

FIG. 11B illustrates a reflectance characteristic of the antireflection film 100 of the present embodiment. FIG. 11B indicates that the antireflection film 100 of Embodiment 8 exhibits a reflectance characteristic of 0.4% or less for an incident angle of 45 degrees or less in the entire visible range, and achieves a high reflection-preventive performance. The reflectance characteristic of the antireflection film 100 of Embodiment 8 is more excellent for an incident angle of 45 degrees and an incident angle of 60 than the reflectance characteristic (FIG. 10) in Embodiment 7.

TABLE 10

| | | n | d (nm) | nd |
|---|---|---|---|---|
| Fine concavo-convex structure | Concavo-convex layer | 1 to 1.404 | 216 | — |
| | Homogeneous layer | 1.404 | 41 | 58 |
| Intermediate layer | Third layer | 1.382 | 30 | 41 |
| | Second layer | 1.780 | 150 | 267 |
| | First layer | 1.561 | 90 | 140 |
| Optical substrate | | 1.440 | — | — |

[Embodiment 9]

Table 11 lists parameters of a configuration of an antireflection film 100 that is Embodiment 9 (ninth embodiment) of the present invention. The antireflection film 100 of Embodiment 9 is formed on the optical substrate 1 having a refractive index of 1.808. The intermediate layer 2 includes the first layer 21 of $Al_2O_3$, the second layer 22 of $Y_2O_3$ and the third layer 23 of $SiO_2$, which are formed by the sputtering method. The fine concavo-convex structure 3 is formed by the same method as that in Embodiment 1.

Figure 12:
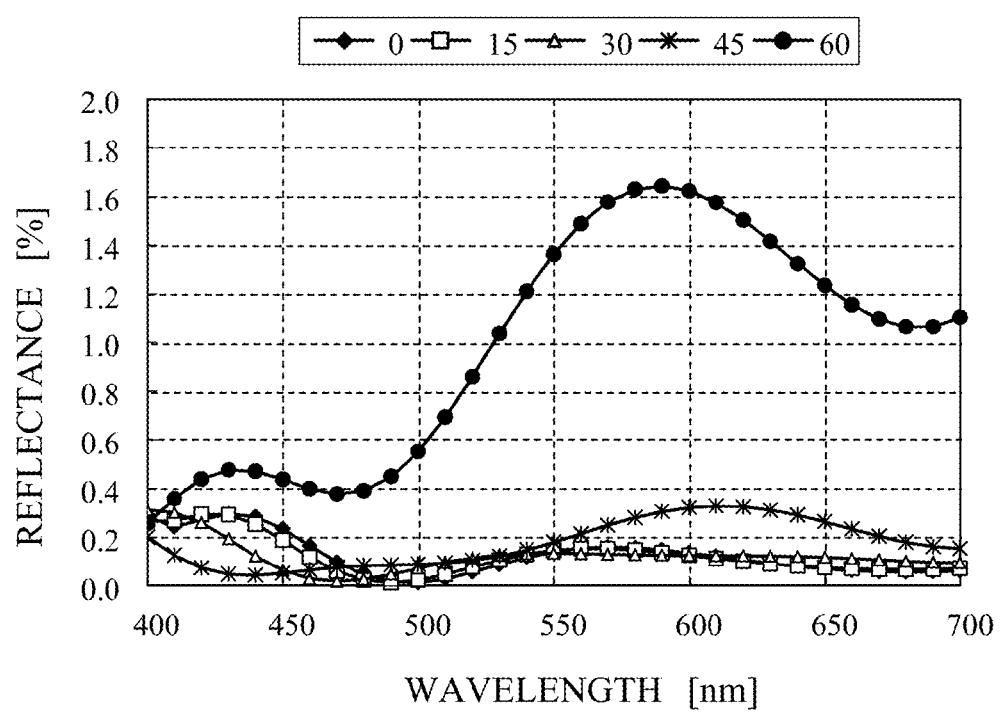
FIG. 12 illustrates a reflectance characteristic in Embodiment 9 of the present invention.

FIG. 12 illustrates a reflectance characteristic of the antireflection film 100 of the present embodiment. FIG. 12 indicates that the antireflection film 100 of Embodiment 9 exhibits a reflectance characteristic of 0.4% or less for an incident angle of 45 degrees or less in the entire visible range, and achieves a high reflection-preventive performance.

TABLE 11

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 20 | 29 |
| | Second layer | 1.840 | 145 | 267 |
| | First layer | 1.621 | 165 | 267 |
| Optical substrate | | 1.808 | — | — |

[Embodiment 10]

Figure 13A:
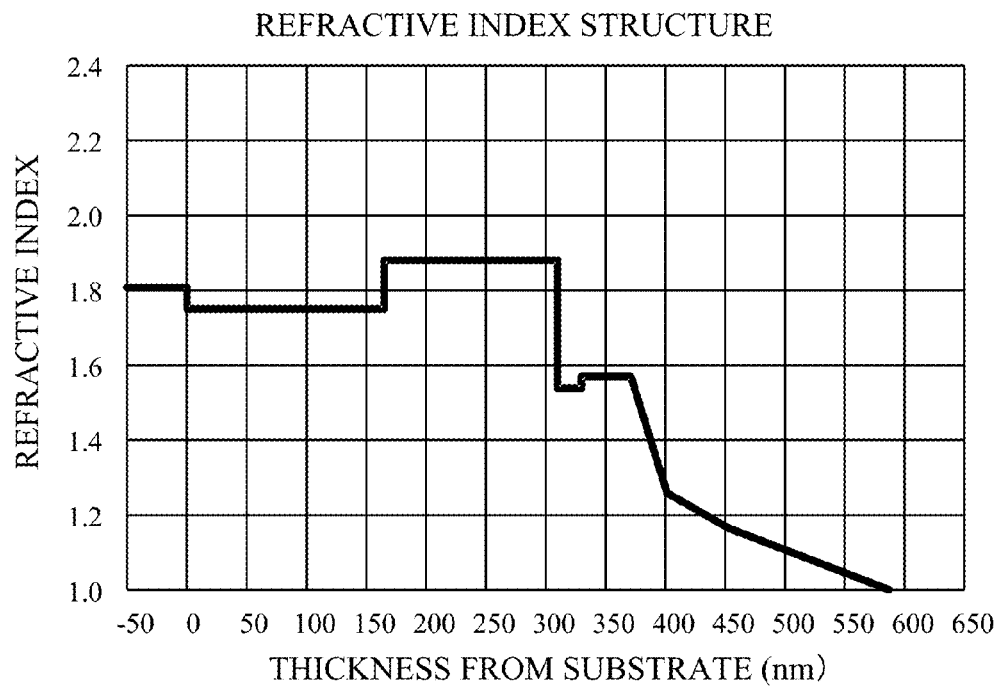
FIG. 13A illustrates a relation of a refractive index with a thickness of an antireflection film that is Embodiment 10 of the present invention.

Table 12 lists parameters of a configuration of an antireflection film 100 that is Embodiment 10 (tenth embodiment) of the present invention. Similarly to Embodiment 9, the antireflection film 100 of Embodiment 10 is formed on the optical substrate 1 having a refractive index of 1.808. The intermediate layer 2 includes the first layer 21 of a composite of $Al_2O_3$ and $ZrO_2$, the second layer 22 of SiO and the third layer 23 of $YF_3$, which are formed by the vacuum evaporation method. The fine concavo-convex structure 3 is formed by the same method as that in Embodiment 1. However, in the present embodiment, the condition of the hot-water immersion treatment is adjusted to have higher refractive indices of the bottom of the fine concavo-convex structure 3 and the homogeneous layer than those in Embodiment 1. FIG. 13A illustrates the refractive index of the antireflection film 100 of the present embodiment in the thickness direction.

Figure 13B:
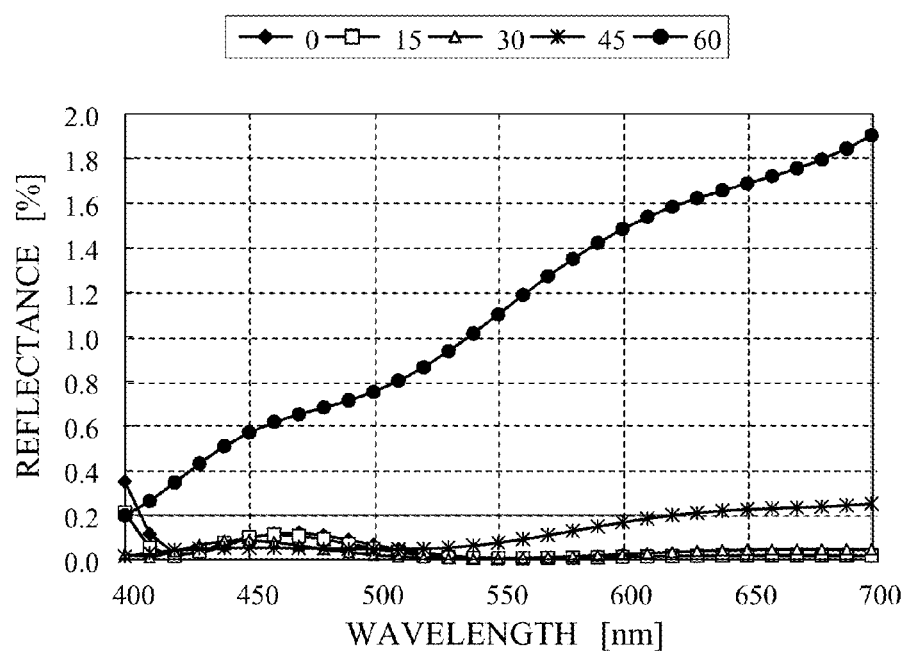
FIG. 13B illustrates a reflectance characteristic in Embodiment 10.

FIG. 13B illustrates a reflectance characteristic of the antireflection film 100 of the present embodiment. FIG. 13B indicates that the antireflection film 100 of Embodiment 10 exhibits a reflectance characteristic of 0.4% or less for an incident angle of 45 degrees or less in the entire visible range, and achieves a high reflection-preventive performance. The antireflection film 100 of Embodiment 10 achieves a more excellent reflectance characteristic for an incident angle of 0 to 45 degrees than the reflectance characteristic (FIG. 12) in Embodiment 9.

TABLE 12

| | | n | d (nm) | nd |
|---|---|---|---|---|
| Fine concavo-convex structure | Concavo-convex layer | 1 to 1.570 | 216 | — |
| | Homogeneous layer | 1.570 | 41 | 64 |
| Intermediate layer | Third layer | 1.539 | 20 | 31 |
| | Second layer | 1.880 | 145 | 273 |
| | First layer | 1.751 | 165 | 289 |
| Optical substrate | | 1.808 | — | — |

[Embodiment 11]

Table 13 lists parameters of a configuration of an antireflection film 100 that is Embodiment 11 (eleventh embodiment) of the present invention. The antireflection film 100 of Embodiment 11 is formed on the optical substrate 1 having a refractive index of 1.658. The intermediate layer 2 includes the first layer 21 of $Al_2O_3$, the second layer 22 of SiO and the third layer 23 of $SiO_2$, which are formed by the vacuum evaporation method. The fine concavo-convex structure 3 is formed by the same method as that in Embodiment 1.

Figure 14:
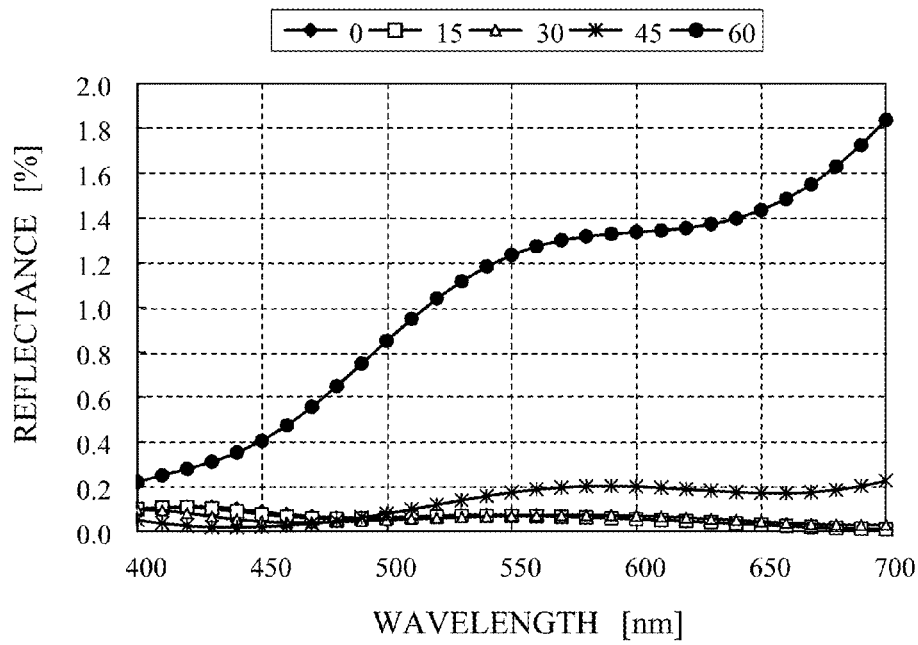
FIG. 14 illustrates a reflectance characteristic in Embodiment 11 of the present invention.

FIG. 14 illustrates a reflectance characteristic of the antireflection film 100 of the present embodiment. FIG. 14 indicates that the antireflection film 100 of Embodiment 11 exhibits a reflectance characteristic of 0.3% or less for an incident angle of 45 degrees or less in the entire visible range, and achieves a high reflection-preventive performance.

TABLE 13

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 20 | 29 |
| | Second layer | 1.723 | 154 | 265 |
| | First layer | 1.621 | 151 | 245 |
| Optical substrate | | 1.658 | — | — |

[Embodiment 12]

Table 14 lists parameters of a configuration of an antireflection film 100 that is Embodiment 12 (twelfth embodiment) of the present invention. The antireflection film 100 of Embodiment 12 is formed on the optical substrate 1 having a refractive index of 1.699. The intermediate layer 2 includes the first layer 21 of $Al_2O_3$, the second layer 22 of a composite of $Al_2O_3$ and $ZrO_2$ and the third layer 23 of $SiO_2$, which are formed by the sputtering method. The fine concavo-convex structure 3 is formed by the same method as that in Embodiment 1.

Figure 15:
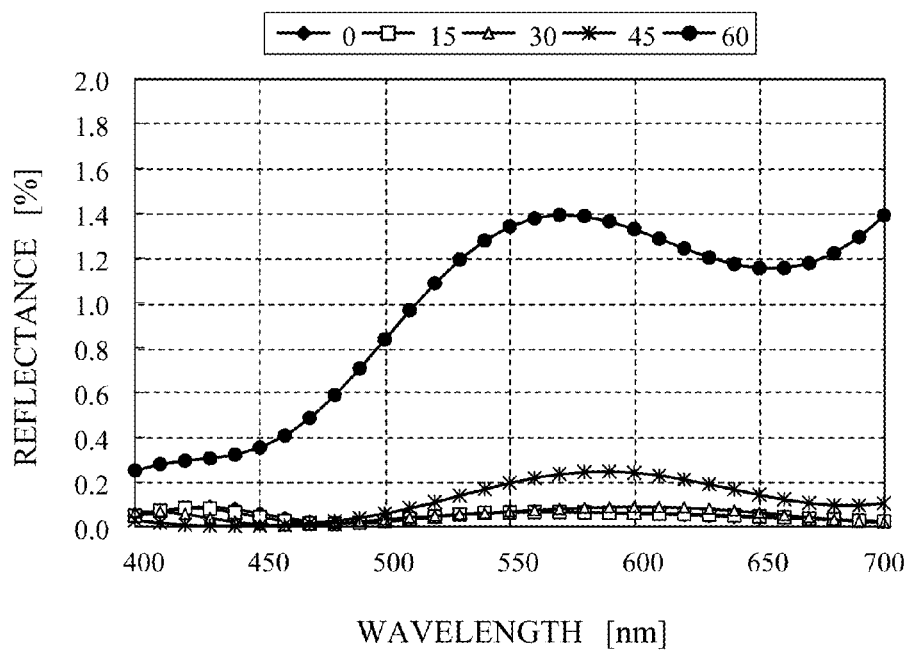
FIG. 15 illustrates a reflectance characteristic in Embodiment 12 of the present invention.

FIG. 15 illustrates a reflectance characteristic of the antireflection film 100 of the present embodiment. FIG. 15 indicates that the antireflection film 100 of Embodiment 12 exhibits a reflectance characteristic of 0.3% or less for an incident angle of 45 degrees or less in the entire visible range, and achieves a high reflection-preventive performance.

TABLE 14

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 1.768 | 149 | 263 |
| | First layer | 1.621 | 150 | 243 |
| Optical substrate | | 1.699 | — | — |

[Embodiment 13]

Table 15 lists parameters of a configuration of an antireflection film 100 that is Embodiment 13 (thirteenth embodiment) of the present invention. The antireflection film 100 of Embodiment 13 is formed on the optical substrate 1 having a refractive index of 1.755. The intermediate layer 2 includes the first layer 21 of $Al_2O_3$, the second layer 22 of $Y_2O_3$ and the third layer 23 of $SiO_2$, which are formed by the sputtering method. The fine concavo-convex structure 3 is formed by the same method as that in Embodiment 1.

Figure 16:
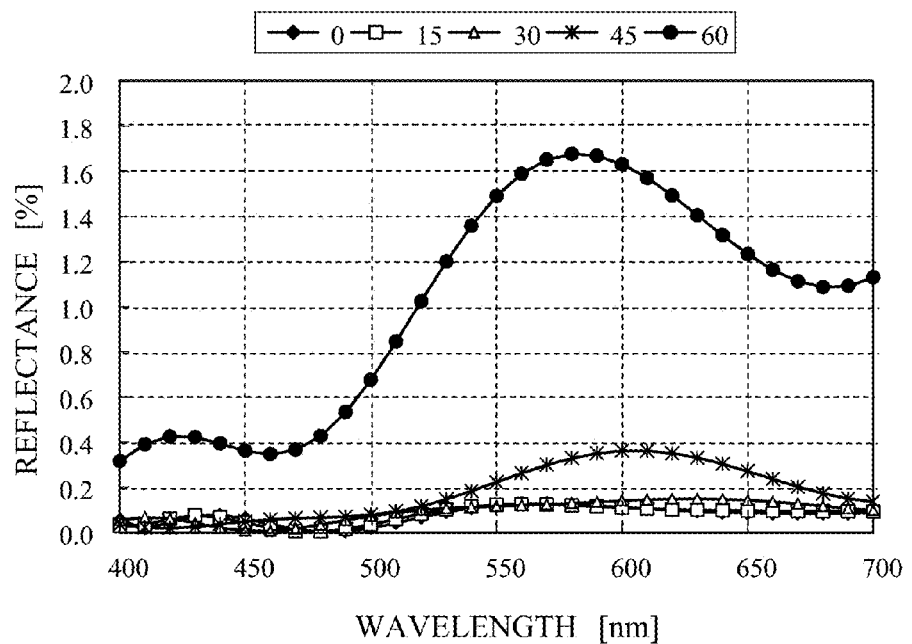
FIG. 16 illustrates a reflectance characteristic in Embodiment 13 of the present invention.

FIG. 16 illustrates a reflectance characteristic of the antireflection film 100 of the present embodiment. FIG. 16 indicates that the antireflection film 100 of Embodiment 13 exhibits a reflectance characteristic of 0.4% or less for an incident angle of 45 degrees or less in the entire visible range, and achieves a high reflection-preventive performance.

TABLE 15

| | | n | d (nm) | nd |
|---|---|---|---|---|
| Fine concavo-convex structure | Concavo-convex layer | 1 to 1.504 | 224 | — |
| | Homogeneous layer | 1.504 | 34 | 51 |
| Intermediate layer | Third layer | 1.459 | 22 | 32 |
| | Second layer | 1.820 | 150 | 273 |
| | First layer | 1.621 | 155 | 251 |
| Optical substrate | | 1.755 | — | — |

[Embodiment 14]

Figure 17:
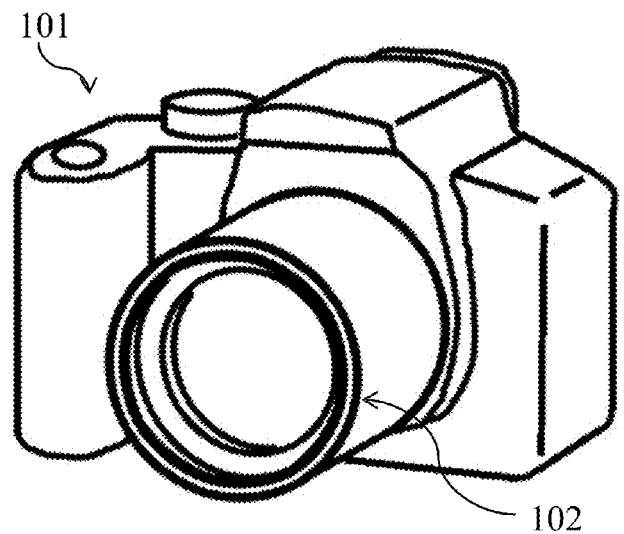
FIG. 17 is a schematic diagram of an optical apparatus that is Embodiment 14 of the present invention.

FIG. 17 is a schematic diagram of an optical apparatus that is Embodiment 14 (fourteenth embodiment) of the present invention. In FIG. 17, reference numeral 101 denotes a digital camera, and reference numeral 102 denotes an image pickup optical system including an optical element on which the antireflection film that is an embodiment of the present invention is formed. Thus, the optical element having the antireflection film of the embodiment of the present invention, the optical system including at least one of the optical element, and an optical device (such as an interchange lens device) or optical apparatus (such as a camera and a projector) on which the optical system is mounted are included in an aspect of the present invention. The image pickup optical system 102 includes a plurality of lenses, and the antireflection film of the embodiment of the present invention is formed on at least one of surfaces of the lenses. Thus, the digital camera in the present embodiment can produce an image with reduced unnecessary light such as flare and ghost, and is a high-quality optical apparatus. The present embodiment describes the digital camera as an example of the optical apparatus, but the present invention is not limited thereto, and is applicable to optical apparatuses such as a binocular and an image projection apparatus.

Each of the embodiments of the present invention can provide an antireflection film exhibiting an excellent incident angle characteristic to a substrate having a low refractive index. Specifically, the embodiment can provide an antireflection film exhibiting an excellent incident angle characteristic in the visible range (400 to 700 nm), especially a high performance antireflection film achieving a reflectance of 0.4% or less for an incident angle of 0 to 45 degrees, and an optical element including the antireflection film.

The present invention is applicable to optical apparatuses such as a compact digital camera, a single-lens reflex camera, a video camera, a binocular, and an image projection apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-172842, filed on Aug. 27, 2014, which is hereby incorporated by reference herein in its entirety.

What is claimed is:

1. An optical element comprising:
a substrate having a refractive index between 1.40 and 1.85 inclusive for light having a wavelength of 550 nm, and
an antireflection film including an intermediate layer arranged on the substrate and a concavo-convex layer arranged on the intermediate layer, wherein:
the concavo-convex layer includes a part having a refractive index that continuously increases from a side closer to a surface toward a side closer to the substrate,
the intermediate layer includes a plurality of thin film layers having different refractive indices, and at least one of the thin film layers has a refractive index higher than the refractive index of the substrate,
the thin film layers include:
a first layer arranged on the substrate, and
a second layer arranged on the first layer and having a physical thickness d2 (nm), and
the following conditional expressions are satisfied:

$ns<n2$, $1.72 \leq n2 \leq 1.95$, and $230 \leq n2d2 \leq 290$, where ns is the refractive index of the substrate at a wavelength of 550 nm, and n2 is a refractive index of the second layer at a wavelength of 550 nm.

2. The optical element according to claim 1, wherein the following conditional expressions are satisfied:

$1.55 \leq n1 \leq 1.76$, and $100 \leq n1d1 \leq 300$, where n1 is a refractive index of the first layer at a wavelength of 550 nm, and and d1 (nm) is a physical thickness of the first layer.

3. The optical element according to claim 1, wherein:
the concavo-convex layer includes a homogeneous layer having a refractive index that does not change in a thickness direction, and
the thin film layers further include a third layer formed on the second layer and having a physical thickness d3 (nm), and
the following conditional expressions are satisfied:

$1.35 \leq na \leq 1.58$, and $70 \leq n3d3 + nada \leq 100$, where na is a refractive index of the homogeneous layer at a wavelength of 550 nm, da (nm) is a physical thickness of the homogeneous layer, and n3 is a refractive index of the third layer at a wavelength of 550 nm.

4. The optical element according to claim 1, wherein the concavo-convex layer consists of plate crystal including aluminum oxide as a primary component.

5. The optical element according to claim 1, wherein:
the concavo-convex layer is formed by performing a hot-water treatment on a layer including aluminum oxide as a primary component, and
the thin film layers are formed by an evaporation method or sputtering method.

6. The optical element according to claim 1, wherein the concavo-convex layer has an average pitch smaller than a shortest wavelength in a use wavelength range.

7. The optical element according to claim 1, wherein a use wavelength range is between 400 nm and 700 nm inclusive.

8. The optical element according to claim 1, wherein the concavo-convex layer has an average pitch smaller than 400 nm.

9. The optical element according to claim 1, wherein the concavo-convex layer has an optical thickness between 180 nm and 300 nm inclusive.

10. An optical system comprising a plurality of optical elements, wherein:
at least one of the optical elements includes a substrate having a refractive index between 1.40 and 1.85 inclusive for light having a wavelength of 550 nm, and an antireflection film including an intermediate layer arranged on the substrate and a concavo-convex layer arranged on the intermediate layer,
the concavo-convex layer includes a part having a refractive index that continuously increases from a side closer to a surface toward a side closer to the substrate,
the intermediate layer includes a plurality of thin film layers having different refractive indices, and at least one of the thin film layers has a refractive index higher than the refractive index of the substrate, and
the thin film layers include:
a first layer arranged on the substrate, and
a second layer arranged on the first layer and having a physical thickness d2 (nm), and the following conditional expressions are satisfied:

$ns<n2$, $1.72 \leq n2 \leq 1.95$, and $230 \leq n2d2 \leq 290$, where ns is the refractive index of the substrate at a wavelength of 550 nm, and n2 is a refractive index of the second layer at a wavelength of 550 nm.

11. The optical element according to claim 1, wherein the thin film layers further include a third layer arranged on the second layer and having a physical thickness d3 (nm), and the following conditional expression are satisfied:

$1.36 \leq n3 \leq 1.55$, and $n_3 d_3 \leq 100$, where n3 is a refractive index of the third layer at a wavelength of 550 nm.

* * * * *